United States Patent
Zeiger et al.

(10) Patent No.: US 8,314,790 B1
(45) Date of Patent: Nov. 20, 2012

(54) LAYER OPACITY ADJUSTMENT FOR A THREE-DIMENSIONAL OBJECT

(75) Inventors: Roni F. Zeiger, Mountain View, CA (US); Arthur E. Blume, Melrose, MA (US); David Kogan, Natick, MA (US); Rachel L. Petterson, Redwood City, CA (US); Won S. Chun, Manhasset, NY (US); Evangelos Kokkevis, Mountain View, CA (US)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 13/433,230

(22) Filed: Mar. 28, 2012

Related U.S. Application Data

(60) Provisional application No. 61/469,038, filed on Mar. 29, 2011.

(51) Int. Cl.
 *G06T 15/00* (2011.01)
 *G09G 5/02* (2006.01)
(52) U.S. Cl. .................................. 345/419; 345/592
(58) Field of Classification Search .................. 345/419, 345/592
See application file for complete search history.

(56) References Cited

U.S. PATENT DOCUMENTS

| | | | |
|---|---|---|---|
| 7,262,783 B2* | 8/2007 | Kramer et al. ............... | 345/629 |
| 7,484,183 B2* | 1/2009 | Look et al. .................... | 715/839 |
| 7,557,804 B1* | 7/2009 | McDaniel ..................... | 345/427 |
| 2002/0011990 A1* | 1/2002 | Anwar ......................... | 345/173 |
| 2003/0193496 A1* | 10/2003 | Wada ............................ | 345/419 |
| 2004/0263512 A1* | 12/2004 | Santodomingo et al. ..... | 345/428 |
| 2006/0055711 A1* | 3/2006 | Hayakawa .................... | 345/629 |
| 2008/0016472 A1* | 1/2008 | Rohlf et al. .................. | 715/848 |
| 2008/0225007 A1* | 9/2008 | Nakadaira et al. ............ | 345/173 |
| 2009/0027418 A1* | 1/2009 | Maru et al. ................... | 345/629 |
| 2009/0132943 A1* | 5/2009 | Minsky et al. ................ | 715/767 |
| 2010/0185976 A1* | 7/2010 | Sadanandan .................. | 715/786 |
| 2011/0307801 A1* | 12/2011 | Sherman ....................... | 715/751 |

OTHER PUBLICATIONS

Visible Body—3D Human Anatomy, Mar. 28, 2012, retrieved from <http://www.visiblebody.com>.

* cited by examiner

*Primary Examiner* — David T Welch
(74) *Attorney, Agent, or Firm* — McDermott Will & Emery LLP

(57) ABSTRACT

Computer-implemented methods for automatically adjusting an opacity of layers in a three-dimensional (3D) object are provided. In one aspect, a method includes receiving a request to display data for a 3D object having a plurality of layers, and providing, for display, data for a view of the 3D object. An opacity of each of the layers of the 3D object in the view is adjusted based on a position of the view of the 3D object. Systems and machine-readable media are also provided.

14 Claims, 7 Drawing Sheets

LAYER OPACITY ADJUSTMENT FOR A THREE-DIMENSIONAL OBJECT

CROSS-REFERENCE TO RELATED APPLICATIONS

The present application claims the benefit of priority under 35 U.S.C. §119 from U.S. Provisional Patent Application Ser. No. 61/469,038 entitled "Searchable 3D Object Viewer," filed on Mar. 29, 2011, the disclosure of which is hereby incorporated by reference in its entirety for all purposes.

BACKGROUND

1. Field

The present disclosure generally relates to the visualization of three-dimensional objects using a computer.

2. Description of the Related Art

Current three-dimensional (3D) rendering systems display 3D objects in a 3D space and allow the objects to be viewed from viewpoints surrounding the 3D object. However, these conventional systems typically require the installation of specialized software in order to permit the 3D object to be displayed in the 3D space. Furthermore, if the 3D object has many distinct features and/or layers, it may be very difficult to locate the distinct features or visualize the distinct layers, let alone locate distinct features on each distinct layer of the 3D object. For example, it is difficult to adjust the opacity of the layers and features of the 3D object in order to easily view a portion of the 3D object.

SUMMARY

According to one embodiment of the present disclosure, a computer-implemented method for automatically adjusting an opacity of layers in a three-dimensional (3D) object is provided. The method includes receiving a request to display data for a 3D object having a plurality of layers, and providing, for display, data for a view of the 3D object. An opacity of each of the layers of the 3D object in the view is adjusted based on a position of the view of the 3D object.

In certain embodiments of the method, an opacity of a layer of the 3D object within the view is adjusted based on the proximity of the layer to the view. In certain embodiments of the method, the method further includes providing data for another view of the 3D object in response to a request from a user, wherein a transition from the view of the 3D object to the other view of the 3D object includes adjusting an opacity of at least one of the plurality of layers of the 3D object based on the transition. In certain embodiments of the method, the opacity of the at least one layer is adjusted during the transition. In certain embodiments of the method, the opacity of the at least one layer is adjusted after the transition. In certain embodiments of the method, the method further includes providing data for another view of the 3D object in response to a request from a user, wherein a transition from the view of the 3D object to the other view of the 3D object includes passing through at least one of the plurality of layers of the 3D object. In certain embodiments of the method, during the transition from the view of the 3D object to the other view of the 3D object, an opacity of the at least one of the plurality of layers that is passed through is decreased. In certain embodiments of the method, another layer that increases in distance from the other view during the transition from the view is increased in opacity. In certain embodiments of the method, the method further includes retrieving from storage and displaying within the view of the 3D object at least one identification label associated with at least one portion of the 3D objection within the view based on input received from the user. In certain embodiments of the method, the method further includes adjusting a position and an opacity of the identification label within the view based on the input received from the user. In certain embodiments of the method, the method further includes providing data for another view of the 3D object in response to a request from a user, wherein the position and the opacity of the identification label within the other view is adjusted based on the position of the other view of the 3D object. In certain embodiments of the method, the layer of the 3D object that is both within the view and furthest from the view remains substantially opaque, and wherein another layer outside of the view becomes substantially transparent. In certain embodiments of the method, the method further includes generating, for display, a layer opacity adjustment interface for the 3D object, the interface includes at least one slide indicator, receiving a request to move a position of the slide indicator, and adjusting an opacity level of the layer of the 3D object based on the position movement of the slide indicator. In certain embodiments of the method, the slide indicator is a vertical slide indicator configured to move along a first axis, and the position of the vertical slide indicator along the first axis is configured to affect the opacity of each of the layers of the 3D object. In certain embodiments of the method, the adjustment interface includes a layer indicator for each layer displayed along the first axis, and movement of the vertical slide indicator across a layer indicator includes an adjustment of an opacity level of the layer indicated by the layer indicator. In certain embodiments of the method, the opacity adjustment interface further includes a horizontal slide indicator for each layer indicator, each horizontal slide indicator is configured to move across the layer indicator along a second axis that is different than the first axis, movement of each horizontal slide indicator across a layer indicator along the second axis includes an adjustment of an opacity level of the layer indicated by the layer indicator, and the position of each horizontal slide indicator is limited to affecting the opacity of the corresponding layer with which the horizontal slide indicator is associated.

According to another embodiment of the present disclosure, a system for automatically adjusting an opacity of layers in a three-dimensional (3D) object is provided. The system includes a memory that includes data for a 3D object having a plurality of layers, and a processor. The processor is configured to receive a request to display data for the 3D object, and provide, for display, data for a view of the 3D object. An opacity of each of the layers of the 3D object in the view is adjusted based on a position of the view of the 3D object. An opacity of at least one layer of the 3D object within the view is adjusted based on the proximity of the at least one layer to the view.

In certain embodiments of the system, the processor is further configured to provide data for another view of the 3D object in response to a request from a user, wherein a transition from the view of the 3D object to the other view of the 3D object includes the processor being configured to adjust an opacity of at least one of the plurality of layers of the 3D object based on the transition. In certain embodiments of the system, the processor is further configured to provide data for another view of the 3D object in response to a request from a user, wherein a transition from the view of the 3D object to the other view of the 3D object includes passing through at least one of the plurality of layers of the 3D object. In certain embodiments of the system, during the transition from the view of the 3D object to the other view of the 3D object, an opacity of the at least one of the plurality of layers that is passed through is decreased. In certain embodiments of the system, the processor is further configured to retrieve from storage and display within the view of the 3D object at least one identification label associated with at least one portion of the 3D objection within the view based on input received from the user. In certain embodiments of the system, the processor is further configured to provide data for another view of the 3D object in response to a request from a user, wherein the position and the opacity of the identification label within the other view is adjusted based on the position of the other view of the 3D object. In certain embodiments of the system, the layer of the 3D object that is both within the view and furthest from the view remains substantially opaque, and wherein another layer outside of the view becomes substantially transparent. In certain embodiments of the system, the processor is further configured to generate, for display, a layer opacity adjustment interface for the 3D object, the interface includes at least one slide indicator, receive a request to move a position of the slide indicator, and adjust an opacity level of at least one of the layers of the 3D object based on the position movement of the slide indicator. In certain embodiments of the system, the slide indicator is a vertical slide indicator configured to move along a first axis, and the position of the vertical slide indicator along the first axis is configured to affect the opacity of each of the layers of the 3D object. In certain embodiments of the system, the adjustment interface includes a layer indicator for each layer displayed along the first axis, and movement of the vertical slide indicator across a layer indicator includes an adjustment of an opacity level of the layer indicated by the layer indicator. In certain embodiments of the system, the opacity adjustment interface further includes a horizontal slide indicator for each layer indicator, each horizontal slide indicator is configured to move across the layer indicator along a second axis that is different than the first axis, movement of each horizontal slide indicator across a layer indicator along the second axis includes an adjustment of an opacity level of the layer indicated by the layer indicator, and the position of each horizontal slide indicator is limited to affecting the opacity of the corresponding layer with which the horizontal slide indicator is associated.

According a further embodiment of the present disclosure, a machine-readable storage medium includes machine-readable instructions for causing a processor to execute a method for automatically adjusting an opacity of layers in a three-dimensional (3D) object is provided. The method includes receiving a request to display data for a 3D object having a plurality of layers, and providing, for display, data for a view of the 3D object. The method also includes providing data for another view of the 3D object in response to a request from a user. A transition from the view of the 3D object to the other view of the 3D object includes adjusting an opacity of at least one of the plurality of layers of the 3D object based on the transition.

According to one embodiment of the present disclosure, computer-implemented method for adjusting an opacity of layers in a layered three-dimensional (3D) object is provided. The method includes generating, for display, a layer opacity adjustment interface for a 3D object having at least one layer, wherein the interface includes at least one slide indicator, and receiving a request to move a position of the slide indicator. The method also includes adjusting an opacity level of the layer of the 3D object based on the position movement of the slide indicator.

In certain embodiments of the method, the 3D object includes multiple layers, the slide indicator is a vertical slide indicator configured to move along a first axis, and the position of the vertical slide indicator along the first axis is configured to affect the opacity of each of the layers of the 3D object. In certain embodiments of the method, the adjustment interface includes a layer indicator for each layer displayed along the first axis, and wherein movement of the vertical slide indicator across a layer indicator includes an adjustment of an opacity level of the layer indicated by the layer indicator. In certain embodiments of the method, the layer indicators are displayed along the first axis in an order indicative of an order in which the layers are generated for display for the 3D object. In certain embodiments of the method, when the vertical slide indicator is positioned at one end of the first axis, each of the layers is substantially opaque, and when the vertical slide indicator is positioned at the other end of the first axis, each of the layers in substantially transparent. In certain embodiments of the method, each layer indicator is represented by an image indicative of the associated layer. In certain embodiments of the method, the opacity adjustment interface further includes a horizontal slide indicator for each layer indicator, each horizontal slide indicator is configured to move across the layer indicator along a second axis that is different than the first axis, movement of each horizontal slide indicator across a layer indicator along the second axis includes an adjustment of an opacity level of the layer indicated by the layer indicator, and the position of each horizontal slide indicator is limited to affecting the opacity of the corresponding layer with which the horizontal slide indicator is associated. In certain embodiments of the method, when a horizontal slide indicator is positioned at one end of the second axis, the corresponding layer is substantially opaque, and when the horizontal slide indicator is positioned at the other end of the second axis, the corresponding layer is substantially transparent. In certain embodiments of the method, the adjustment interface is limited to generating a first mode for displaying the vertical slide indicator or a second mode for displaying the horizontal slide indicators. In certain embodiments of the method, the adjustment interface includes a switching mechanism for switching between the first mode and the second mode.

According to another embodiment of the present disclosure, system for generating an adjustment interface for adjusting an opacity of layers in a layered three-dimensional object is provided. The system includes a memory that includes instructions, and a processor. The processor is configured to execute the instructions to generate, for display, a layer opacity adjustment interface for a 3D object includes multiple layers, wherein the interface includes at least one slide indicator, and receive a request to move a position of the slide indicator. The processor is also configured to execute the instructions to adjust an opacity level of at least one of the layers of the 3D object based on the position movement of the slide indicator.

In certain embodiments of the system, the slide indicator is a vertical slide indicator configured to move along a first axis, and the position of the vertical slide indicator along the first axis is configured to affect the opacity of each of the layers of the 3D object. In certain embodiments of the system, the adjustment interface includes a layer indicator for each layer displayed along the first axis, and wherein movement of the vertical slide indicator across a layer indicator includes an adjustment of an opacity level of the layer indicated by the layer indicator. In certain embodiments of the system, the layer indicators are displayed along the first axis in an order indicative of an order in which the layers are generated for display for the 3D object. In certain embodiments of the system, when the vertical slide indicator is positioned at one end of the first axis, each of the layers is substantially opaque, and when the vertical slide indicator is positioned at the other end of the first axis, each of the layers in substantially transparent. In certain embodiments of the system, each layer indicator is represented by an image indicative of the associated layer. In certain embodiments of the system, the opacity adjustment interface further includes a horizontal slide indicator for each layer indicator, each horizontal slide indicator is configured to move across the layer indicator along a second axis that is different than the first axis, movement of each horizontal slide indicator across a layer indicator along the second axis includes an adjustment of an opacity level of the layer indicated by the layer indicator, and the position of each horizontal slide indicator is limited to affecting the opacity of the corresponding layer with which the horizontal slide indicator is associated. In certain embodiments of the system, when a horizontal slide indicator is positioned at one end of the second axis, the corresponding layer is substantially opaque, and when the horizontal slide indicator is positioned at the other end of the second axis, the corresponding layer is substantially transparent. In certain embodiments of the system, the adjustment interface is limited to generating a first mode for displaying the vertical slide indicator or a second mode for displaying the horizontal slide indicators, and wherein the adjustment interface includes a switching mechanism for switching between the first mode and the second mode.

According to a further embodiment of the present disclosure, machine-readable storage medium includes machine-readable instructions for causing a processor to execute a method for adjusting an opacity of layers in a layered three-dimensional object is provided. The method includes generating, for display, a layer opacity adjustment interface for a 3D object having multiple layers. The adjustment interface includes a vertical slide indicator configured to move along a first axis, wherein the position of the vertical slide indicator along the first axis is configured to affect the opacity of each of the layers of the 3D object, and a layer indicator for each layer displayed along the first axis, wherein movement of the vertical slide indicator across a layer indicator includes an adjustment of an opacity level of the layer indicated by the layer indicator. The adjustment interface also includes a horizontal slide indicator for each layer indicator that is configured to move across the layer indicator along a second axis that is different than the first axis, wherein movement of each horizontal slide indicator across a layer indicator along the second axis includes an adjustment of an opacity level of the layer indicated by the layer indicator, and wherein the position of each horizontal slide indicator is limited to affecting the opacity of the corresponding layer with which the horizontal slide indicator is associated. The method also includes receiving a request to move a position of the vertical slide indicator or the horizontal slide indicator, and adjusting an opacity level of a layer of the 3D object based on the position movement of the vertical slide indicator or the horizontal slide indicator.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

The disclosed system uses a web browser with integrated (e.g., built in) 3D modeling and searching capabilities for viewing and searching a 3D image or object, such as a web browser pre-installed with WebGL. Using the enhanced web browser, the user can view, search and transcend layers of the 3D image, each view having a separate Uniform Resource Locator (URL). For example, a user viewing a 3D model of the human body can start from an external view of the liver and transcend, layer by layer, through the liver in order to view a bile duct, with each layer automatically adjusting in opacity based on the user's current view. The user can stop at any layer/level and investigate, in detail, the human body and use search queries, alphanumeric or otherwise, to locate certain details. A user's view of the 3D human body can roam over the surface at a given layer or gradually transcend from one layer to another in a seamless fashion, such as by transcending from one layer/structure to another by making the current layer/structure more transparent as the user leaves that layer/structure on the journey to the next layer/structure, or the user's view can traverse through the layers.

Exemplary Architecture

Figure 1:
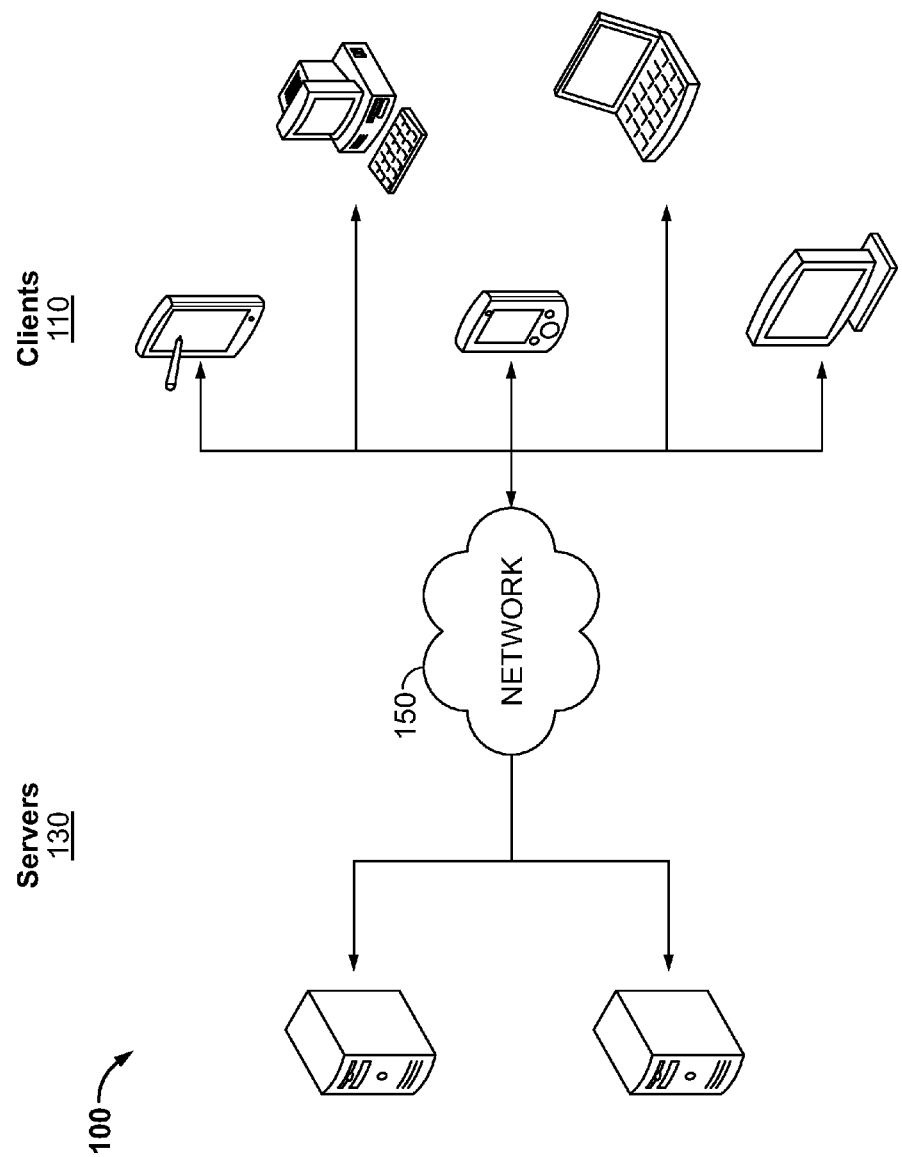
FIG. 1 illustrates an exemplary architecture for viewing and searching a 3D object using a web browser having integrated 3D modeling and searching capabilities.

FIG. 1 illustrates an exemplary architecture 100 for viewing and searching a 3D object using a web browser having integrated 3D modeling and searching capabilities. The architecture includes servers 130 connected to clients 110 over a network 150. The servers 130 are configured to host and/or provide searchable data of a 3D object, such as the human body, including related content such as web pages and user generated or provided content. In certain aspects, the searchable data of the 3D object includes a polygon mesh that defines the shape of a polyhedral object in 3D space that is representative of the 3D object. The searchable data can include identifiers of portions of the 3D object that can be searched using a query received from a user. For example, the searchable data of the 3D object can represent an organism, such as a human, dog, or ant, or an inanimate object such as a car engine. As another example, the searchable data of the 3D object can represent a 3D object having no internal structure, such as a sculpture, where the user in response to entering the query "head" is automatically shown the head of the sculpture. For purposes of load balancing, the searchable data can be hosted either on one or many separate servers 130.

The servers 130 can be any device having an appropriate processor, memory, and communications capability for hosting the searchable data of the 3D object and related content. The clients 110 to which the servers are connected over the network 150 can be, for example, desktop computers, mobile computers, tablet computers, mobile devices (e.g., a smartphone or PDA), set top boxes (e.g., for a television), video game consoles, or any other devices having appropriate processor, memory, and communications capabilities. The network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

Each of the clients 110 is configured to receive part or all of the searchable data of the 3D object and display the searchable data to a user of the client 110 for the user to view in a 3D space, search, edit, and annotate. The user can view, at varying levels of detail, the 3D object from a position at any point outside or inside of the object, and can move the position of the view using an input device such as a keyboard, mouse, or a touchscreen. The user can also to choose adjust the opacity of portions of the 3D object, such as by reducing the opacity of a surface layer to zero in order to see through the surface layer and view an inner layer. The user can further search the 3D object by entering a query. For example, when the user types "lung," the opacity of the skin, muscular, and skeletal layers of a 3D human body is reduced and the position of the view is adjusted so that the user can see a lung. These features will be discussed in more detail herein below.

The searchable data of the 3D object is retrieved by the client 110 from the server 130 using a 3D enhanced application, such as a web browser or mobile application. The 3D enhanced web browser includes an integrated 3D modeling and searching capability that is built-in to the web browser, e.g., a part of the web browser by default, as a standard, at the time the web browser is downloaded and installed on the client 110. An exemplary 3D modeling and searching capability is provided by WebGL, a 3D graphics application programming interface. Exemplary 3D enhanced web browsers include web browsers pre-installed with WebGL.

Exemplary Client and Server

Figure 2:
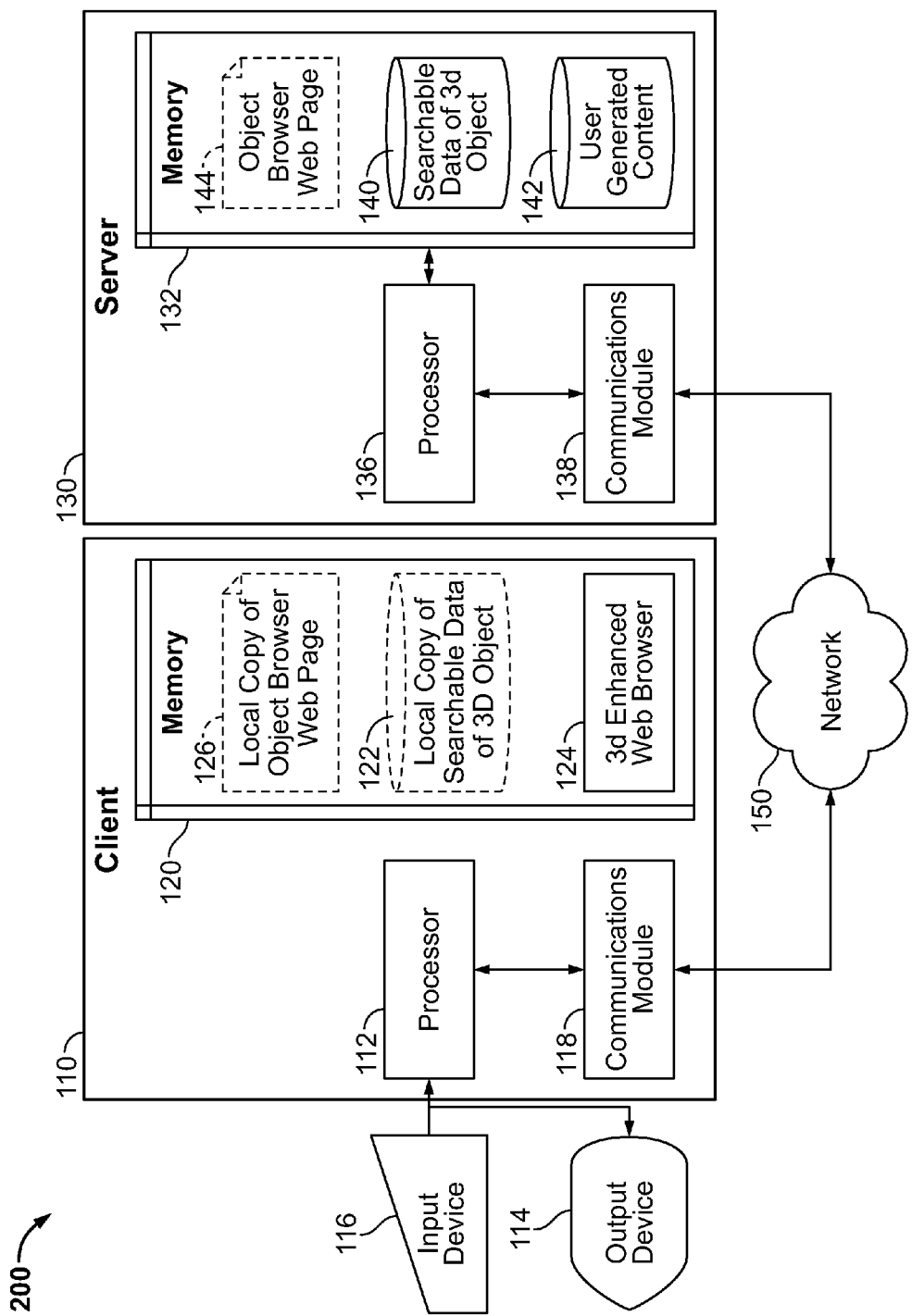
FIG. 2 is a block diagram illustrating an exemplary client and server in the architecture of FIG. 1 according to certain aspects of the disclosure.

FIG. 2 is a block diagram 200 illustrating an exemplary client 110 and server 130 in the architecture 100 of FIG. 1 according to certain aspects of the disclosure. The client 110 and the server 130 are connected over the network 150 via respective communications modules 118 and 138. The communications modules 118 and 138 are configured to interface with the network 150 to send and receive information, such as data, requests, responses, and commands to other devices on the network. The communications modules 118 and 138 can be, for example, modems or Ethernet cards.

The server 130 includes a processor 136, the communications module 138, and a memory 132. The memory 132 includes viewable and searchable data of the 3D object 140 ("searchable data of the 3D object 140"), a web page 144 for instructing a 3D enhanced web browser on how to model and search the 3D object (hereinafter "object browser web page 144") using the searchable data of the 3D object 140, and user generated content 142 related to the searchable data of the 3D object 140. The client 110 includes a processor 112, the communications module 118, an input device 116, an output device 114, and a memory 120. The memory 120 of the client 110 includes the 3D enhanced web browser 124 and optionally includes a local copy of the object browser web page 126 and a local copy of the searchable data of the 3D object 122. Thus, the object browser web page 144 and the searchable data of the 3D object 140 can be locally stored or remotely stored. A determination of whether to store a local copy of the object browser web page 126 and a local copy of the searchable data of the 3D object 122 can be made by the 3D enhanced web browser 124. For example, the 3D enhanced web browser 124 can include a setting of whether to store files in a local cache, or the object browser web page 144 itself can determine, for example, to stream only necessary information from the searchable data of the 3D object 140 to the client 110 and not store it in the memory 120 of the client.

The local copy of the object browser web page 126 and the local copy of the searchable data of the 3D object 122 are loaded into the memory 120 of the client 110 after a user of the client 110 (hereinafter simply "the user") selects the web address for the object browser web page 144 in the 3D enhanced web browser 124, and the 3D enhanced web browser 124 sends a request to the server 130 for the object browser web page 144 and related searchable data of the 3D object 140. The processor 136 of the server is configured to receive the request from the 3D enhanced web browser 124, and provide to the 3D enhanced web browser 124 of the client 110, in response to the request, the searchable data of the 3D object 140 and the object browser web page 144. The client 110 can then store the local copy of the object browser web page 126 and the local copy of the searchable data of the 3D object 122 in its memory 120. In the alternative, the web browser 124 of the client 110 downloads the searchable data of the 3D object 140 on demand (e.g., streaming), and/or an initial portion of the searchable data of the 3D object 140 is stored locally (e.g., as the local copy of the searchable data of the 3D object 122) to begin the display of the 3D object on the output device 114 and the remaining portion of the searchable data of the 3D object 140 is downloaded as requested or needed by the 3D enhanced web browser 140 for display on the output device 114.

The processor 112 of the client 110 is configured to execute instructions, such as instructions physically coded into the processor 112, instructions received from software in memory 120, or a combination of both. For example, the processor 112 of the client 110 is configured to execute instructions from the local copy of the object browser web page 126 causing the processor 112 to display, in the 3D enhanced web browser 124 on the output device 114, at least a portion of the 3D object based on an initial default view, or a user selected view based on a query received from the user using the input device 116. As discussed herein in more detail, a view of the 3D object can include features to provide an opacity of the different portions of the 3D object, rotation of the 3D object, zoom, whether any portion of the 3D object has been selected, the state of any interfaces displayed, parameters related to customization of the 3D object generated by a user, and any annotations on the 3D object. The output device 114 can be a computer display, such as a touch screen display. The query can be an alphanumeric input, such as "liver" or "2" (for cervical spinal nerve 2), or input from an input device 116. Similarly, the query can be an alphanumeric input indirectly related to a portion of the 3D object (e.g., for a human body, the entry "cirrhosis" can map to the liver) based on, for example, pre-defined mappings, user-generated contents, or implicit connections, such as prior user history. Exemplary input devices 116 include a keyboard, mouse, or touch screen display. Using the input device 116, the user can view any portion of the 3D object in the 3D enhanced web browser 124 from any angle at any position inside or outside the 3D object. The user can also use the input device 116 to search the 3D object and create, edit, and delete user generated content 142 related to the 3D object that is displayed on the output device 114.

Although the block diagram 200 illustrates, in the same memory 132 of a single server 130, the searchable data of the 3D object 140, the user generated content 142, and the object browser web page 144, the searchable data of the 3D object 140, the user generated content 142, and the object browser web page 144 can be in different memories and/or on different servers 130 as discussed above with reference to FIG. 1.

Obtaining Searchable Data for a 3D Object on the Client

Figure 3:
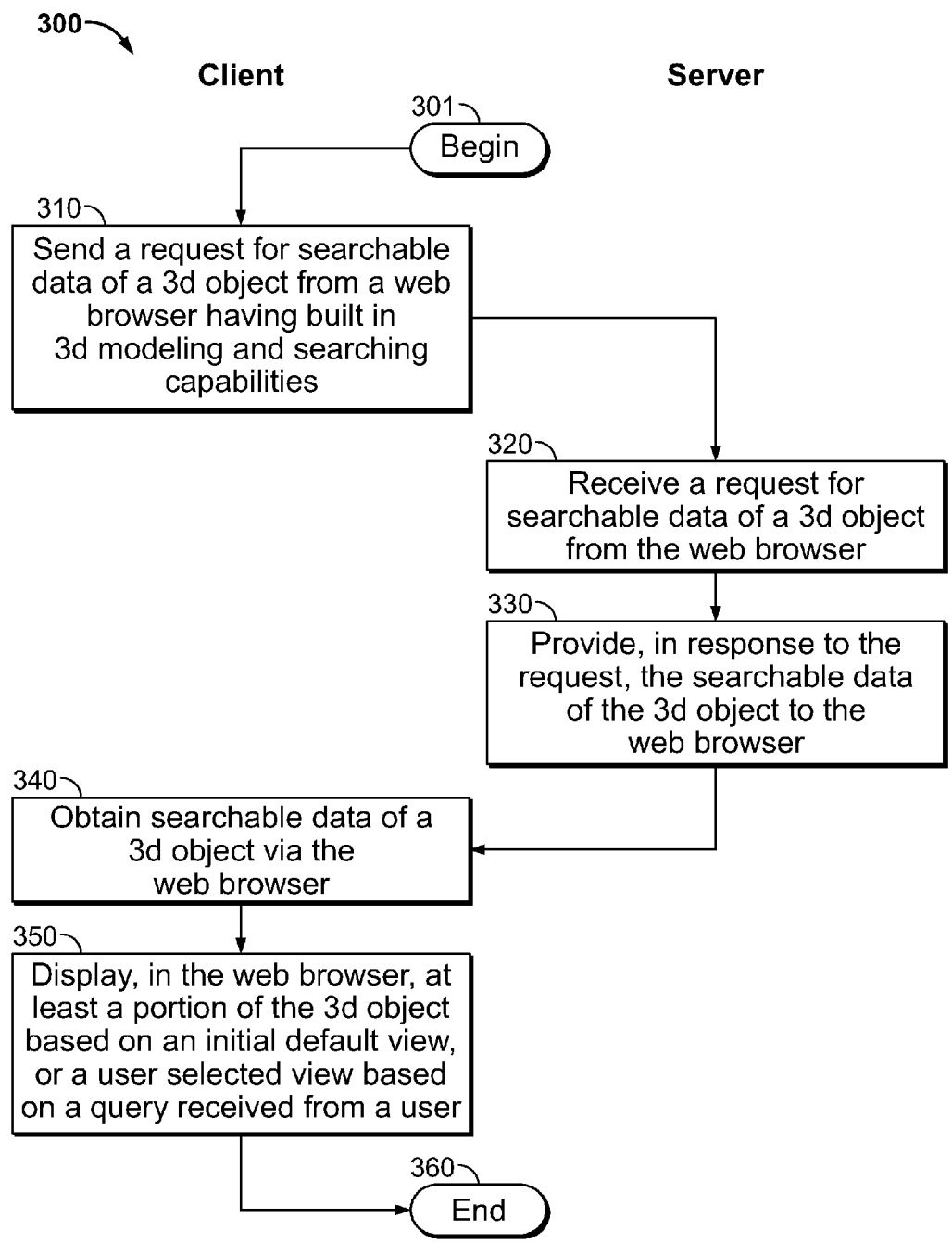
FIG. 3 illustrates an exemplary process for obtaining searchable data of a 3D object from the server of FIG. 2 using the 3D enhanced web browser of the exemplary client of FIG. 2

FIG. 3 illustrates an exemplary process 300 for obtaining searchable data of the 3D object from the server 130 of FIG. 2 using the 3D enhanced web browser 124 of the exemplary client 110 of FIG. 2.

The process 300 begins by proceeding from step 301 to step 310 when the user of a client 110 loads the 3D enhanced web browser 124 and enters an address, such as a Uniform Resource Locator (URL), for the viewable and searchable 3D object web page. In step 310, the 3D enhanced web browser 124 sends a request to the server 140 for the web page 144 and its related searchable data of the 3D object 140. In step 320, the server 130 receives the request. A copy of the searchable data of the 3D object 140 is available on the server 130 to provide in response to the request.

The copy of the related searchable data of the 3D object 140 and a copy of web page 144 is provided in step 330 by the server 130, in response to the request from the client 110, to the 3D enhanced web browser 124 on the client 110. In step 340, the client 110 obtains the copy of the web page 144 and a copy of the searchable data of the 3D object 140 via the 3D enhanced web browser 124. A local copy of the web page 126 and a local copy of the searchable data of the 3D object 122 are stored in the memory 120 of the client 110. In step 350, the client 110 uses a monitor 114 to display the exemplary screenshot of an initial default view of the 3D object loaded in the 3D enhanced web browser 124 as shown in FIG. 4A, and the process 300 ends in step 360.

Viewing the 3D Image in a 3D Enhanced Web Browser

Figure 4A:
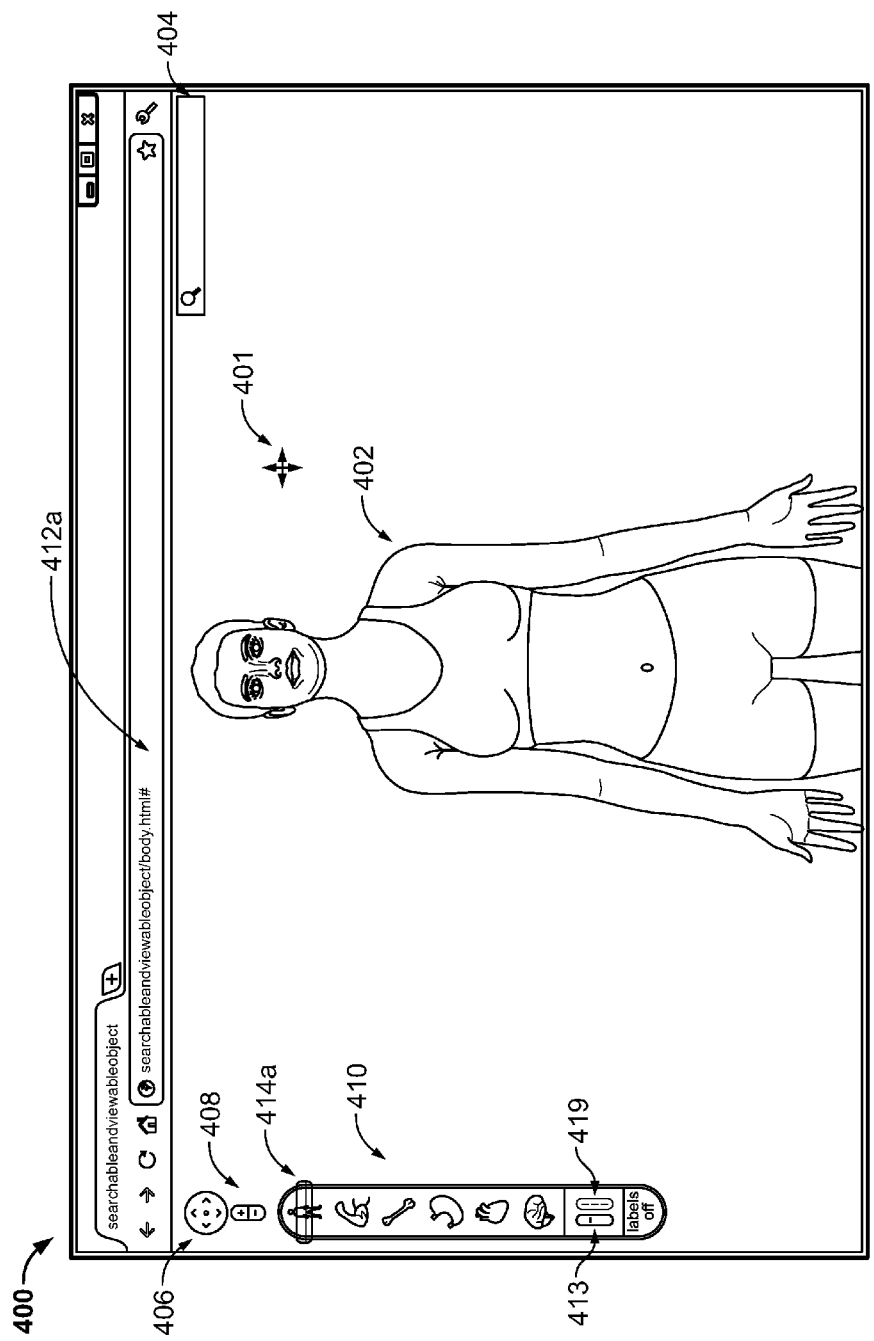
FIGS. 4A-4C are exemplary screenshots of viewing and searching a 3D object using a web browser having integrated 3D modeling and searching capabilities on the exemplary client of FIG. 2.

Having obtained searchable data of the 3D object at the client 110 from the server 130 using the 3D enhanced web browser 124, FIG. 4A illustrates a screenshot 400 of an initial default view of a 3D object 402 as displayed on the output device 114. In exemplary FIGS. 4A-4C, the 3D object is a human body. The initial default view shows an outer surface of a portion of a 3D object 402, a female human body, and more specifically, the outside of a clothed female human body, including skin. Although a female human body is used in the screenshots, a male human body can also be used. Furthermore, although a human body is used in the screenshots, another 3D object could be used.

The user interface of FIG. 4A includes the 3D object 402, an input field 404 for entering a query to be searched, a position control 406 for moving the position of the current view, a zoom control 408 for adjusting the zoom of the current view, and an opacity adjustment interface 410 (hereinafter referred to as "slider 410") having a movable indicator 414*a* for adjusting the opacity of the outer surface and/or internal structures (collectively referred to as "layers") of the 3D object 402. As discussed herein, the outer surface includes, but is not limited to, the skin and portions of the body near to or in contact with the external surface of the skin, such as eyes, hair, teeth, ears, nails, and lips. The internal structures include, but are not limited to, inner anatomical layers, biological systems, and organs, down to the tissues, cells, and molecular structures such as DNA or proteins.

Any part of the 3D object 402, whether as a whole or in part, let alone any part of the outer surface or the internal structures, are often referred to herein as "portions" or "items" of the 3D object 402 and can be displayed by the 3D enhanced web browser 124 using the searchable data of the 3D object 140. Furthermore, in addition to the displayed user interface controls 406, 408, and 410, the user can use the input device 116, illustrated by cursor 401, to change the position of the view and the level of zoom of the view of the 3D object 402 to view any portion of the 3D object 402 from any angle (e.g., not limited to any axis). For example, the user can view the heart from the outside of the heart or the inside of the heart. As another example, the user can press and hold a button on a mouse input device 116 while dragging the cursor 401 across the screen in any direction in order to rotate the 3D object 402 in that direction.

In certain aspects, the 3D object 402 is viewable using a modified axial navigation model. Vertical user camera position control (e.g., up and down mouse gestures or keystrokes) shifts the 3D object 402 vertically in the view and horizontal user camera position control (e.g., left and right mouse gestures or keystrokes) rotate the 3D object 402 horizontally. The axial navigation model allows significant visibility of a vertically oriented model without the navigational complexity and disorientation that can occur in 3D displays with more degrees of navigational freedom. As such, the 3D object 402 can be a vertically or horizontally oriented model. In order to facilitate viewing of the top or bottom of a vertically oriented 3D object 402 presented axially, an additional feature added to the camera view modifies the navigational surface of the 3D object from which the camera view is positioned. Specifically, instead of a limited X/Y navigation over a notional cylinder, the navigational surface of a vertically oriented 3D object 402 is a cylinder with hemispherical ends (e.g., at the top and bottom). The modification permits viewing of the top or bottom of a vertically oriented 3D object 402 while retaining the navigational simplicity of the X/Y model.

Any internal structure or portion of the 3D object 402 can be rendered by the 3D enhanced web browser 124 and viewed from any position using the searchable data of the 3D object 140, including, with reference to a human body, inner anatomical layers, biological systems, organs, tissues, cells, and molecular structures.

Local Data Retrieval and Remote Data Streaming

The processor 112 of the client 110 is configured to retrieve, either from the local copy of the searchable data of the 3D object 122 on the client 110 or the searchable data of the 3D object 140 on the server, sufficient searchable data to render the 3D object 402 in response to a query from the user. For example, based on the position of the user's cursor 401 and the associated changing of the view of the 3D object 402, the searchable data 122 or 140 is being retrieved, from the memory 120 on the client 110 or the memory 132 of the server 130, for processing by the processor 112 and display on the output device 113. In certain aspects, the amount of searchable data 122 or 140 retrieved depends on the position of the cursor 401 (e.g., within the 3D space) and the current view.

In certain aspects, the searchable data of the 3D object 140 is retrieved from the memory 132 of the server 130 for storage on the client 110 all at once, as discussed above with reference to FIG. 3. In certain aspects, the searchable data of the 3D object 140 is streamed from the memory 132 of the server 130 as needed by the processor 112 of the client 110 for displaying on the output device 113 to render the 3D object 402 in response to a query from the user.

Specifically, the level of detail of the displayed portion of the 3D object 402 can be streamed to the client 110 for display by the processor 112 based on the proximity of the user's current view to the portion of the 3D object 402. In certain aspects, lower-resolution textures of the 3D object are first downloaded by the client 110, and higher-resolution textures are later downloaded if the user's current view increases in proximity to a portion of the 3D object 402. Furthermore, levels of detail need only be downloaded once. For example, if a lower-resolution texture A is downloaded for a portion of the 3D object 402, and it is followed by a download of a higher-resolution texture B for the same portion, the higher-resolution view of the portion of the 3D object 402 is synthesized incrementally by the higher-resolution texture B being limited to the difference from the lower-resolution texture A (e.g., texture B is added into texture A). This is accomplished using standard web browser image file formats and scripting capabilities.

By way of example, the current view in FIG. 4A shows the external surface of the 3D object 402, the human body, where the human heart would not normally be visible. Accordingly, the processor 112, based on instructions from the local copy of the object browser web page 128, can request that only the searchable data for the outer surface of the 3D object 402 be provided to the client 110 in order to render the current view. If the user changes the current view to another view (e.g., of the human heart) or requests a more detailed rendering of the current view, either of which requiring additional searchable data of the 3D object 140 for rendering, then that additional searchable data can be streamed from the server 130 to the client 110 for rendering.

In certain aspects, the 3D object 402 can be previewed using two-dimensional (2D) previewing. The server 130 can rotate the 3D object 402 in increments and capture a view from each position as an image. The images can then be appended together, for example, using a thumbnail strip ("thumbstrip") graphic. The sequence of images can then be provided for presentation in an application that does not have integrated 3D modeling and searching capabilities. The sequence of images, when displayed sequentially, would appear as a 2D movie of the associated rotation of the 3D object 402.

Bookmarks

The initial default view 400 is associated with the URL 412a displayed, "http://viewableandsearchableobject/body.html#." The address or URL 412a for each view (also referred to as a "bookmark") is unique to the view and can be shared with other users to allow the other users to see the same view the sharing user sees. The bookmark captures the view of the 3D object 402 in a URL, and includes parameters identifying the view, such as an amount of time to display the view, the opacity of the layers of the 3D object 402, rotation of the 3D object 402, zoom, whether any portion of the 3D object 402 has been selected, the state of the slider 410, parameters related to customization of the 3D object 402 generated by a user, and any annotations on the 3D object 402. In certain aspects, these parameters are included after a hash "#" symbol in the URL 412a. When parameters of the 3D view change (e.g., portions are selected/deselected, portions change opacity, the position of the view changes), the parameters in the URL are updated. In certain aspects, the update occurs after a predetermined amount of time in order to avoid creating a significant number of URL entries (e.g., in the URL storage history) of the web browser 124. Such state representation within the URL 412a allows for navigation back to previous views by pressing a previous page view button in the web browser 124 (e.g., a practical form of "undo" without having to implement an undo mechanism).

The bookmark can also be shared with another user by sending a link to the URL (e.g., URL 412a) to the other user by, for example, simply copying the URL and pasting it into an email. When the other user loads the shared URL in a 3D enhanced web browser, the other user will see the same view seen by the user who shared the URL.

Layer Slider

Figure 4B:
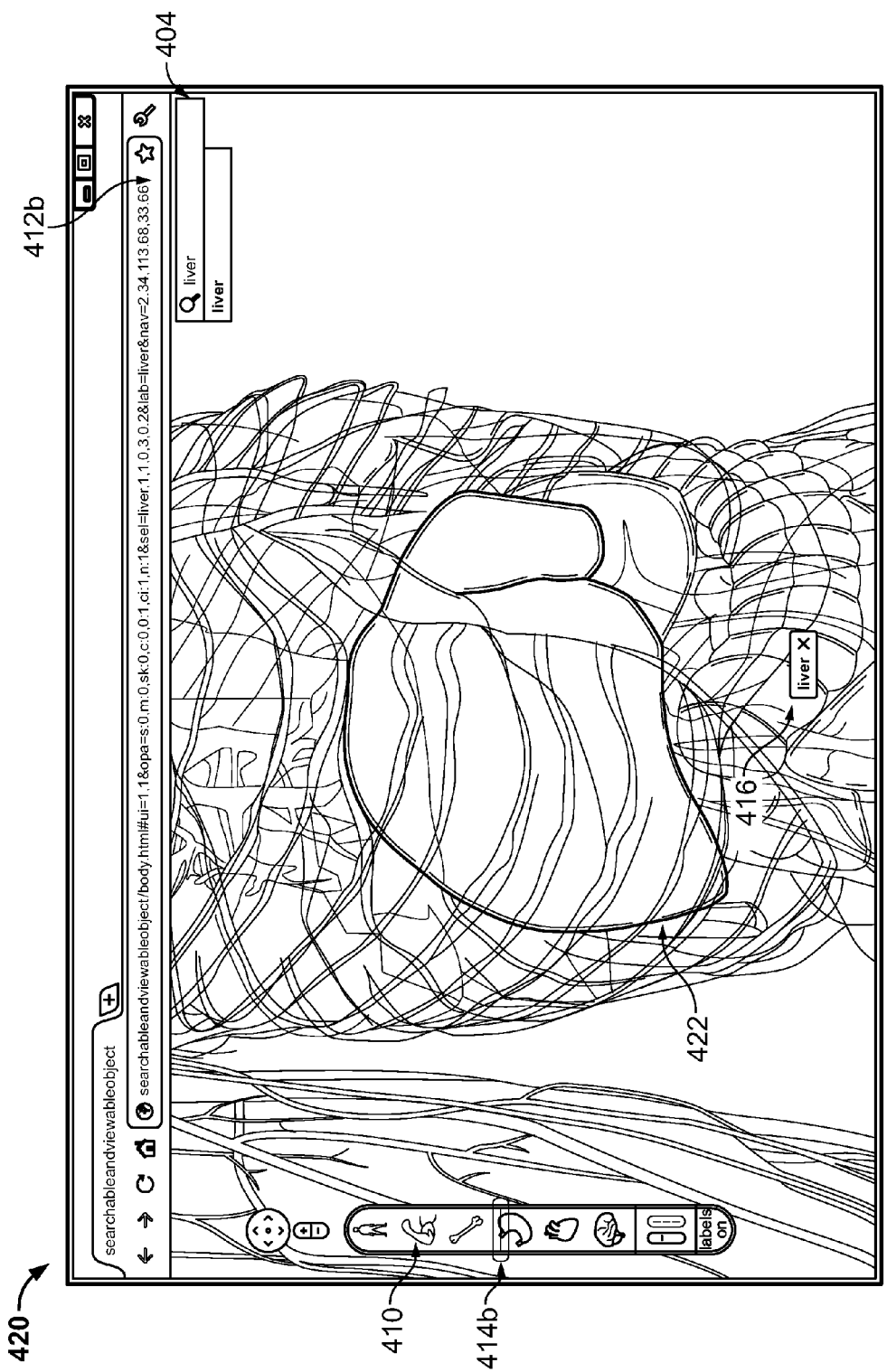

FIG. 4B is an exemplary screenshot of the 3D enhanced web browser 124 from the viewing angle of FIG. 4A after the slider 410 has been switched from a global adjustment mode in FIG. 4A to an individual adjustment mode. The processor 112 is configured to display the layer slider 410, which includes a labels button 415 for choosing to display selected labels of the portions of the 3D object 402 from the current view, a selection mechanism 418 for selecting between a global adjustment mode of layers, namely the outer surface and/or internal structures, of the 3D object 402, and an individual adjustment mode of layers, and a plurality of horizontal slide indicators 418a-f, namely, a horizontal slide indicator for the skin 418a, a horizontal slide indicator for the muscular system 418b, a horizontal slide indicator for the skeletal system 418c, a horizontal slide indicator for the organ system 418d, a horizontal slide indicator for the circulatory system 418e, and a horizontal slide indicator for the nervous system 418f, configured to move along a x-axis and adjust the opacity of their respective 3D human body portions. The individual adjustment mode of the layers is displayed in the order in which the layers appear in the 3D object 402.

Returning to FIG. 4A, which illustrates the slider 410 in a global adjustment mode designated by a first selection 413 of the selection mechanism 419, the slider 410 includes a vertical slide indicator 414a configured to move along a y-axis. The position of the vertical slide indicator 414a along the y-axis jointly affects the opacity of portions of the 3D object 402. For example, when the vertical slide indicator 414 is at an uppermost position, as illustrated in FIG. 4A, all portions of the 3D object 402 are opaque and the view is limited to the external surface of the 3D object 402. As the vertical slide indicator 414a moves down the y-axis of the slider 410, portions of the 3D object 402 become less opaque in order of inward movement, e.g., first the skin becomes less opaque, then the muscular system becomes less opaque, and so on, until the nervous system is made less opaque. When the vertical slide indicator 414a moves up the y-axis of the slider 410, portions of the 3D object 402 become more opaque in the opposite order that they were made less opaque when the vertical slide indicator 414a moved down the y-axis of the slider 410.

Returning to FIG. 4B, which illustrates the slider 410 in the individual adjustment mode designated by a second selection 417 of the selection mechanism 419, the slider 410 includes the horizontal slide indicators 418a-f configured to move along the x-axis. The position of the horizontal slide indicators 418a-f in FIG. 4B reflects the specific opacity of their respective 3D human body portions from the screenshot 430 of FIG. 4A. In FIG. 4B, the horizontal slide indicator for the skin 418a, the horizontal slide indicator for the muscular system 418b, the horizontal slide indicator for the skeletal system 418c, the horizontal slide indicator for the organ system 418d, the horizontal slide indicator for the circulatory system 418e, and horizontal slide indicator for the nervous system 418f are in the rightmost position, indicating that the skin, the muscular system, the skeletal system, the organ system, the circulatory system, and the nervous system of the 3D object 402 are completely opaque. However, each of these layers is configured to become less opaque (i.e., more transparent) as their corresponding horizontal slide indicator 418a-f moves towards the left. If a horizontal slide indicator 418a-f is in a leftmost position, the corresponding layer is transparent (i.e., not opaque). Similarly, if a horizontal slide indicator 418a-418f is in an intermediate position between a leftmost position and a rightmost position, the corresponding layer would be partially opaque.

In certain aspects not illustrated, both the vertical slide indicator 414c and the horizontal slide indicators 418a-f can be displayed together, such that the adjustment of one type of indicator on the slider 410 automatically affects the position of the other type of indicator on the slider 410. Furthermore, although slide indicators are disclosed as being vertical or horizontal, slide indicators can be provided in various other directions, along various other axes, or without a single axes.

Search

FIG. 4B is an exemplary screenshot of the 3D enhanced web browser 124 from another view, specifically, a view responsive to the user entering the query "liver" into the input field 404. The user can enter any query into the input field 404, and any portions of the 3D object 402 matching the query will be identified, selected, and displayed in the 3D enhanced web browser 124. The view of FIG. 4B, which is identified by and retrievable with the URL 412b "http://viewableandsearchableobject/body.html#ui=1,1&opa=s:0,m:0,sk:0,c:0,o:1,ci:1,n:1&se1=Liver,1,1,0.3,0.2&lab=Liver&nav=2.34,113.68, 33.66" reflects a transition from the initial default view 400 of FIG. 4A and its related URL 412a to the view illustrated. A label 416 for the liver is displayed in response to the query.

Navigation Via Searching, Autocompletion, and Instant Navigation

The input field 404 is configured to provide the features of navigation via searching, autocompletion, and instant navigation via autocompletion. With navigation via searching, as the user begins entering a query into the input field 404, the current view of the camera is adjusted to display the first term matching the currently entered query in the input field. For example, as the user types the query "liver," the intermediate query "l" identifies the shortest matching term, "lung," and changes the current view to a view of the lung. When the intermediate query becomes "li," the shortest matching term, "liver," is identified and the current view changes to a view of the liver as illustrated in FIG. 4B.

Autocompletion provides the user with suggested (or "computer generated") results displayed below the input field 404 that match the user's currently entered query in the input field 404. For example, as the user types the query "liver," the intermediate query "l" identifies suggested results, in order of word length, of: lung, liver, lunate, lacriminal, lumbrical, levator ani, lumbar disc, longus colli, fan ligament, and fibrous loop. In certain aspects, the suggested results can be listed in order of popularity. If the user cycles through the identified suggested results, such as by using the keyboard cursor to select any of these results, the current view of the 3D object 402 will change from viewing one identified suggested result to the next (e.g., from a view of the liver to a view of the lunate), which is known as instant navigation via autocompletion. After the user types "i" to make the intermediate query "li," a single suggested result of "liver' is identified, as illustrated in FIG. 4B.

Transcending Layers and Automatic Hiding and Showing Layers

When the position of the current view of the 3D object 402 changes in response to a query that is received from the user, the position can pass through, "transverse," or "transcend" through the layers (e.g., transcending can include both ascending through a layer or descending through a layer). At the same time, the opacity of the layers of the 3D object 402 changes.

For example, returning to the exemplary screenshot from FIG. 4A, the current view is of the outer surface of the 3D object 402. The layers of the 3D object 402 are completely opaque as illustrated by the position of the indicator 414a on the slider 410, which is at an uppermost position. When the current view transcends from an external layer, through the external layer, to an internal layer, or more specifically from the outer surface of the 3D object 402 through to an internal structure, the liver, in FIG. 4B in response to the query "liver," the opacity of the layers of the 3D object 402 are automatically changed to facilitate viewing of the liver. During this process, the view displays to the user a transcending through the three most external layers, the skin, the muscular system, and the skeletal system, as those layers are made less opaque so that the layer at which the liver is present, the organ system, is more viewable to the user. The processor 112 is configured to adjust, based on the position of the user's current view of the 3D object 402, the level of opacity of the layers, and the processor 112 is further configured to transcend the current view from a first point on one side of a layer, through the layer, to a second point on the other side of the layer. The transition does not, however, require that the view of the 3D object 402 pass through a layer of the 3D object.

An opacity of a layer of the 3D object 402 within the view can be adjusted based on the proximity of the layer to the view. The view transcending to the second point having a second view causes the opacity of the layers of the 3D object 402 to be adjusted based on the transition. The opacity of the at least one layer can be adjusted during the transition or after the transition. The opacity of the layer that is passed through can be decreased as a result of the transition, and another layer that increases in distance from the other view during the transition from the view can be increased in opacity. In certain aspects, the layer of the 3D object 402 that is both within the view and furthest from the view remains substantially opaque (e.g., the inner most layer of the 3D object 402), and wherein another layer outside of the view becomes substantially transparent (e.g., a layer outside the current view of the 3D object 402). The position and opacity of any portion of the 3D object 402 within the view can also be adjusted based on view of the 3D object 402, and also based on a transition from one view of the 3D object 402 to another view of the 3D object 402.

The opacity configuration of the layers after the transcending through layers is shown by the position of the indicator 414b of the slider 410 in FIG. 4B, which has moved down in position as compared to the position of the indicator 414a in FIG. 4A. The layers in the slider 410 above the position of the indicator 414a are less opaque or not opaque at all and the layers in the slider 410 below the position of the indicator 410 are more opaque or completely opaque.

Selection and Groups

When a portion of the 3D object 402 is selected, it is made more opaque/solid than neighboring portions of the 3D object 402, and an appropriate label (e.g., in the context of the human body, medical label) for the selected portion is displayed. In certain aspects, multiple portions of the 3D human 502 can be selected, either simultaneously or serially. A portion or multiple portions of the 3D object 402 can be selected in response to a query by a user, whether the query is a search using the input field 404 or a selection or using a input pointing device 116 (e.g., by clicking with a mouse or by using a lasso-type pointer or using marquee selection).

In certain aspects, the selection of multiple portions of the 3D object 402 can be selected by rendering the portions (e.g., model entities) of the 3D object 402 in distinct flat colors in an off-screen buffer, and then checking the pixel color under the cursor position. Multiple levels of selection can exist, such as, for example, when a portion(s) of the 3D object 402 is selected, the remaining portions of the 3D object 402 are made translucent on a first level and the selected portion(s) are made opaque on a second level. The user can choose between levels of selection via a user interface gesture such as, for example, by again selecting (e.g., via a mouse click) the selected portion of the 3D object 402.

The query by the user can include use of a selection tool that allows selection of one or multiple portions of the 3D object 402, and that can further allow the user to select one or multiple portions of the 3D human body to hide or otherwise reduce the visibility of those portions so as to better view other portions that were obscured by the now-hidden portions. In certain aspects, a selected portion of the 3D object 402 can be fixed to a certain opacity level (e.g., completely opaque or completely transparent) by selecting that portion, selecting a label associated with that portion, and/or switching to a "pin" mode. In pin mode, an additional interface can be provided that allows: portions of the 3D object 402 to be "pinned" (e.g., fixed to a certain opacity level), pinned portions of the 3D object 402 to be highlighted, pinned portions of the 3D object 402 to be listed (e.g., which checkboxes to pin/un-pin portions of the 3D object 402), and groups of pinned portions of the 3D object 402 to be unpinned.

In certain aspects, the user can select and isolate any portion of the 3D object 402 for viewing. For example, the user can select a user-defined portion of the forearm of the 3D object 402 using a lasso type tool and make the rest of the 3D object 402 transparent, and then view the user-defined portion of the forearm from any angle. This is accomplished, for example, using selection-specific navigation. In certain aspects, selection-specific navigation extends axial model navigation by generating a bounding box around one or more selected entities (e.g., selected via search or mouse click). A navigational surface, such as a cylindrical or bihemispherical surface, is fitted to the bounding box. Thus, when a user selects a portion of the 3D object 402, the user is automatically zoomed in to a closer view of the selected portion of the 3D object 402 that centers upon the selected portion. The remaining portions of the 3D object 402 can be made more transparent (e.g., invisible), thereby allowing the user to focus on the selected portion of the 2D object without increasing the complexity of the axial navigation paradigm. When the user deselects the portion of the 3D object 402, the user can be zoomed out to a farther-out view in which the rotational axis of the view passes through the center of the 3D object 402.

When a portion of the 3D object 402 is selected, including by selecting a label associated with that portion, the view of the selected portion can be refined and/or enhanced by adjusting the opacity of certain portions of the 3D human body as well as adjusting the zoom. The selected portions of the 3D object 402 can be related (e.g., in response to a query for "rotator cuff," the muscles of the rotator cuff, the supraspinatus, infraspinatus, teres minor, and subscapularis can be selected together) or arbitrary (e.g., the user can select any number of portions of the 3D human body by clicking them with a mouse). These selected portions can be identified and stored as a group. The information on the group can be stored remotely in the user generated content 142 database in the memory 132 of the server 130. The group can be an arbitrary group of body portions or a related group of body portions.

Selective Labeling

Figure 4C:
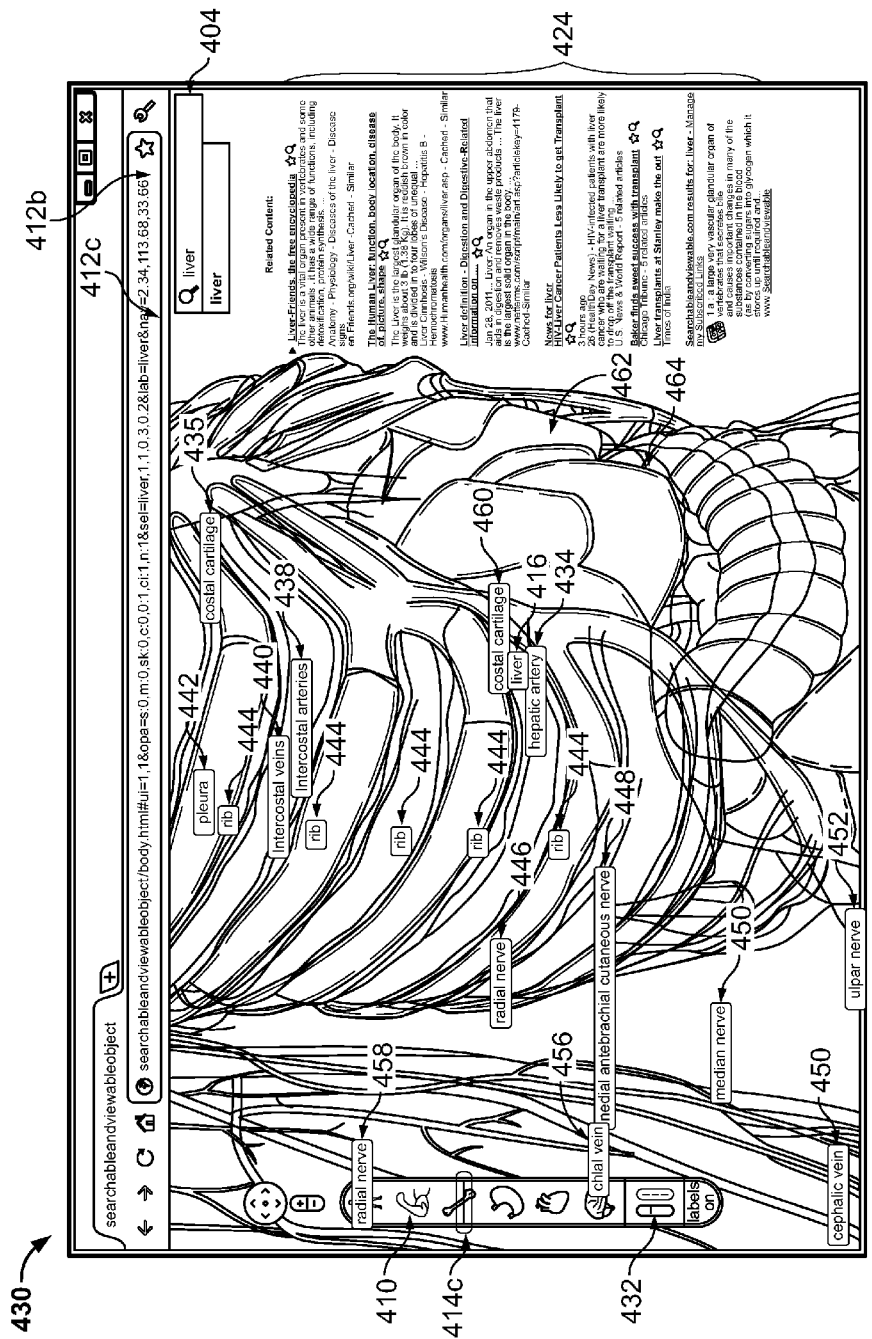

FIG. 4C is an exemplary screenshot 430 of the 3D enhanced web browser 124 from the viewing angle of FIG. 4B after the opacity level of the slider and labeling features have been modified. Specifically, a labeling option 432 on the slider 410 to display all relevant labels in the current view has been activated and the indicator 414D has been moved up to increase the opacity of the skeletal system layer. As a result, the skeletal system is more opaque in the current view of FIG. 4C and more labels are displayed as compared to the view of FIG. 4B. The current view of FIG. 4C is identified by and retrievable with the URL 412c "http://viewableandsearchableobject/body.html#ui=1,1&opa=s:0,m:0,sk:0.6,c:0.6,o:1,ci:1,n:1&sel=&lab=&nav=2.34,113.68,33.66."

The exemplary screenshot 430 of FIG. 4C includes a display of many labels 416 and 434 to 460 identifying portions of the 3D object 402. The displayed labels 416 and 434 to 460 are selected for display from a larger group of labels reflecting any portion of the object 402 within the bounds of the viewing area of the 3D enhanced browser 124. The labels 416 and 434 to 460 that are selected for display are selected based on a determination of large structures displayed in the 3D enhanced browser 124 from among the layers of labels that can be displayed and the plurality of structures that are displayed. Thus, in certain aspects, the selected labels that are displayed are limited to the layer of the body being viewed and limited to a given area of the view (e.g., like a "flashlight"). For example, in certain instances, labels that are within a certain radius surrounding the current position of the view or a mouse pointer are displayed. With reference to FIG. 4C, although the spleen 462 and stomach 464 are displayed in the 3D enhanced browser 124, labels for the spleen 462 and stomach 464 are not displayed. On the other hand, a costal cartilage label 460, a liver label 416, and a hepatic artery label 434, which are near the spleen 462 and stomach 464, are displayed, because the associated costal cartilage, liver, and hepatic artery are determined to be large structures within the display of the 3D enhanced browser 124.

In certain embodiments, labels can be selected for display based on other determinations, such as by weighting. For example, based on a current view of a 3D object 402, a determination is made regarding the visibility of portions of the 3D object 402, the size of portions of the 3D object 402, the opacity of portions of the 3D object 402, the proximity of portions of the 3D object 402 to the current view, and the order of layers of the 3D object. Heavier weights are assigned to portions of the 3D object 402 that are more visible, larger, more opaque, closer to the current view, and nearer to the outermost layer of the 3D object. A determination is then made to display labels for portions have sufficient weight, such as a weight greater than or equal to a predetermined threshold weight.

Annotations

The user can further generate annotations for any portion of the 3D object 402 for display in the 3D enhanced web browser 124. In certain aspects, annotations are a special type of label that otherwise follow the rules for displaying labels disclosed above and are searchable using the input field 404. Annotations include user-defined labels. The user can assign annotations to one or many portions of the body, such as by creating an arbitrary group of body parts and assigning the arbitrary group an annotation. These annotations can be shared in, and displayed with, the bookmarks described above. For example, the content, location, and display parameters of an annotation can be stored as part of the URL of the bookmark. The annotations can be stored in the user generated content 142 database in the memory 132 of the server 130 for accessibility and viewing by other users.

The annotations can include text describing the associated body portion, such as a definition of the associated body portion or an explanation of a medical procedure or condition related to the associated body portion. The annotations can be used to teach students, such as by providing annotations with definitions or annotations that are examination questions.

In certain embodiments, the user can generate an annotation by selecting (e.g., via a mouse click) a surface of any portion of the 3D object 402. At the point of selection, a visible marker can be displayed on the model, and a textual annotation or other form of content (e.g., image, hyperlink, video) can be associated with the marker. As the user navigates around the 3D object 402, the annotation is shown floating near the marker with its position continuously updated with any moving of the marker. The annotation can be shown or hidden depending on the presence of other content or the visibility or opacity of the portion or layer of the 3D object 402 with which the annotation is associated. Markers and their associated annotations can additionally be highlighted as part of a textual search on the model.

Associated Articles and Community Editable Content

The user's current view may include content associated with the view. The content can include, for example, reference articles and community generated and/or editable content. The content can be, for example, content associated with a query from the user related to the user's current view. The content can also be, for example, content associated with the portions of the 3D object 402 displayed in the user's current view. FIG. 4C, a view of the human liver 422, also includes an optional display of related content 424 that includes an article on the liver from Wikipedia and a definition of the term "liver." The user can further generate or edit content to be displayed in the related content 424 section, such as an article related to the liver.

Exemplary Computer System for the Server and/or Client

Figure 5:
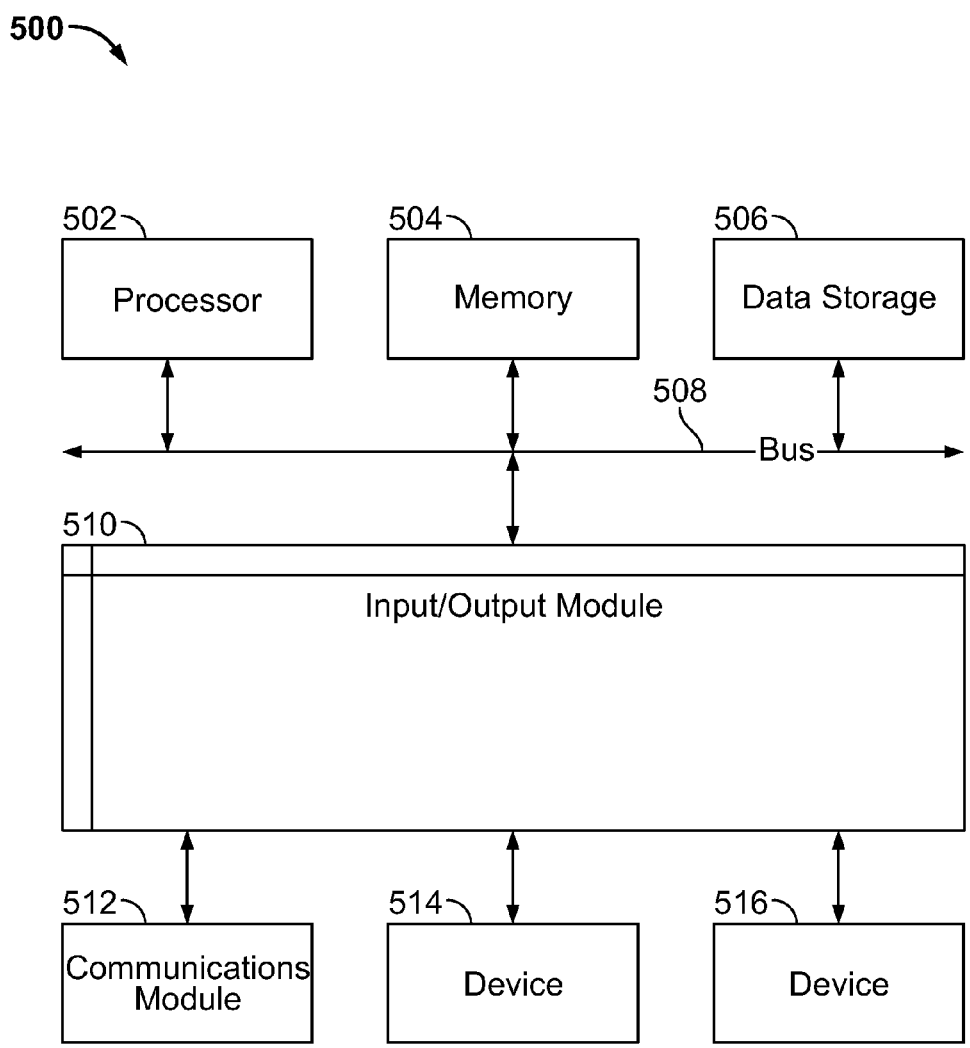
FIG. 5 is a block diagram illustrating an exemplary computer system with which the clients and servers of FIG. 1 can be implemented.

FIG. 5 is a block diagram illustrating an exemplary computer system with which the clients 110 and servers 130 of FIG. 1 can be implemented. In certain aspects, the computer system 500 may be implemented using hardware or a combination of software and hardware, either in a dedicated server, or integrated into another entity, or distributed across multiple entities.

Computer system 500 (e.g., clients 110 and servers 130) includes a bus 508 or other communication mechanism for communicating information, and a processor 502 (e.g., processor 112 and 136) coupled with bus 508 for processing information. By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504 (e.g., memory 120 and 132), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, i.e., one or more modules of computer program instructions encoded on a computer readable medium for execution by, or to control the operation of, the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Exemplary input/output modules 510 include data ports such as USB ports. The input/output module 510 is configured to connect to a communications module 512 (e.g., communications module 118 and 138). Exemplary communications modules 512 include networking interface cards, such as Ethernet cards and modems. In certain aspects, the input/output module 510 is configured to connect to a plurality of devices, such as an input device 514 (e.g., input device 116) and/or an output device 516 (e.g., output device 114). Exemplary input devices 514 include a keyboard and a pointing device, e.g., a mouse or a trackball, by which a user can provide input to the computer system 500. Other kinds of input devices 514 can be used to provide for interaction with a user as well. For example, feedback provided to the user can be any form of sensory feedback, e.g., visual feedback, auditory feedback, or tactile feedback; and input from the user can be received in any form, including acoustic, speech, or tactile input. Exemplary output devices 516 include display devices, such as a CRT (cathode ray tube) or LCD (liquid crystal display) monitor, for displaying information to the user.

According to one aspect of the present disclosure, the client 110 and server 130 can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network and a wide area network.

Computing system 500 can include clients and servers. A client and server are generally remote from each other and typically interact through a communication network. The relationship of client and server arises by virtue of computer programs running on the respective computers and having a client-server relationship to each other. Computer system 500 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions to processor 502 for execution. Such a medium may take many forms, including, but not limited to, non-volatile media, volatile media, and transmission media. Non-volatile media include, for example, optical or magnetic disks, such as data storage device 506. Volatile media include dynamic memory, such as memory 504. Transmission media include coaxial cables, copper wire, and fiber optics, including the wires that comprise bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

Systems, methods, and machine-readable media for using a 3D-enhanced web browser to view and search a 3D object, such as the human body, have been described. In certain aspects, using the 3D enhanced web browser, a user can view, search, and transcend layers of the 3D human body. The user can further customize the appearance of the 3D human body and share view of the 3D human body using many of the tools and features disclosed.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features can in some cases be excised from the combination, and the combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

What is claimed is:

1. A computer-implemented method for automatically adjusting an opacity of layers in a three-dimensional (3D) object, the method comprising:
    receiving a request to display data for a 3D object having a plurality of layers; and
    providing, for display, data for a view of the 3D object, wherein an opacity of each of the layers of the 3D object in the view is adjusted based on a position of the view of the 3D object;
    generating, for display, a layer opacity adjustment interface for the 3D object, wherein the interface comprises a slide indicator, and a layer indicator for each layer of the 3D object displayed along a first axis;
    receiving a request to move a position of the slide indicator along the first axis; and
    adjusting an opacity level of a layer of the 3D object based on the position movement of the slide indicator,
    wherein movement of position of the slide indicator over a layer indicator is configured to adjust an opacity level of the layer indicated by the layer indicator.

2. The computer-implemented method of claim 1, wherein an opacity of a layer of the 3D object within the view is adjusted based on the proximity of the layer to the view.

3. The computer-implemented method of claim 1, further comprising providing data for another view of the 3D object in response to a request from a user, wherein a transition from the view of the 3D object to the other view of the 3D object comprises adjusting an opacity of at least one of the plurality of layers of the 3D object based on the transition.

4. The computer-implemented method of claim 1, further comprising providing data for another view of the 3D object in response to a request from a user, wherein a transition from the view of the 3D object to the other view of the 3D object comprises passing through at least one of the plurality of layers of the 3D object.

5. The computer-implemented method of claim 4, wherein, during the transition from the view of the 3D object to the other view of the 3D object, an opacity of the at least one of the plurality of layers that is passed through is decreased.

6. The computer-implemented method of claim 4, wherein another layer that increases in distance from the other view during the transition from the view is increased in opacity.

7. The computer-implemented method of claim 1, wherein the layer of the 3D object that is both within the view and furthest from the view remains substantially opaque, and wherein another layer outside of the view becomes substantially transparent.

8. The computer-implemented method of claim 1,
wherein the slide indicator is a vertical slide indicator,
wherein the opacity adjustment interface further comprises a horizontal slide indicator for each layer indicator,
wherein each horizontal slide indicator is configured to move across the layer indicator along a second axis that is different than the first axis,
wherein movement of each horizontal slide indicator across the layer indicator along the second axis comprises an adjustment of an opacity level of the layer indicated by the layer indicator, and
wherein the position of each horizontal slide indicator is limited to affecting the opacity of the corresponding layer with which the horizontal slide indicator is associated.

9. A system for automatically adjusting an opacity of layers in a three-dimensional (3D) object, the system comprising:
a memory comprising data for a 3D object having a plurality of layers;
a processor configured to:
receive a request to display data for the 3D object;
provide, for display, data for a view of the 3D object, wherein an opacity of each of the layers of the 3D object in the view is adjusted based on a position of the view of the 3D object;
generate, for display, a layer opacity adjustment interface for the 3D object, wherein the interface comprises a slide indicator, and a layer indicator for each layer of the 3D object displayed along a first axis;
receive a request to move a position of the slide indicator along the first axis; and
adjust an opacity level of a layer of the 3D object based on the position movement of the slide indicator,
wherein movement of position of the slide indicator over a layer indicator is configured to adjust an opacity level of the layer indicated by the layer indicator, and
wherein an opacity of at least one layer of the 3D object within the view is adjusted based on the proximity of the at least one layer to the view.

10. The system of claim 9, wherein the processor is further configured to provide data for another view of the 3D object in response to a request from a user, wherein a transition from the view of the 3D object to the other view of the 3D object comprises the processor being configured to adjust an opacity of at least one of the plurality of layers of the 3D object based on the transition.

11. The system of claim 9, wherein the processor is further configured to provide data for another view of the 3D object in response to a request from a user, wherein a transition from the view of the 3D object to the other view of the 3D object comprises passing through at least one of the plurality of layers of the 3D object.

12. The system of claim 11, wherein, during the transition from the view of the 3D object to the other view of the 3D object, an opacity of the at least one of the plurality of layers that is passed through is decreased.

13. The system of claim 9,
wherein the slide indicator is a vertical slide indicator,
wherein the opacity adjustment interface further comprises a horizontal slide indicator for each layer indicator,
wherein each horizontal slide indicator is configured to move across the layer indicator along a second axis that is different than the first axis,
wherein movement of each horizontal slide indicator across the layer indicator along the second axis comprises an adjustment of an opacity level of the layer indicated by the layer indicator, and
wherein the position of each horizontal slide indicator is limited to affecting the opacity of the corresponding layer with which the horizontal slide indicator is associated.

14. A non-transitory machine-readable storage medium comprising machine-readable instructions for causing a processor to execute a method for automatically adjusting an opacity of layers in a three-dimensional (3D) object, the method comprising:
receiving a request to display data for a 3D object having a plurality of layers; and
providing, for display, data for a view of the 3D object;
providing data for another view of the 3D object in response to a request from a user, wherein a transition from the view of the 3D object to the other view of the 3D object comprises adjusting an opacity of at least one of the plurality of layers of the 3D object based on the transition;
generating, for display, a layer opacity adjustment interface for the 3D object, wherein the interface comprises a slide indicator, and a layer indicator for each layer of the 3D object displayed along a first axis;
receiving a request to move a position of the slide indicator along the first axis; and
adjusting an opacity level of a layer of the 3D object based on the position movement of the slide indicator,
wherein movement of position of the slide indicator over a layer indicator is configured to adjust an opacity level of the layer indicated by the layer indicator.

\* \* \* \* \*